(12) United States Patent  
Clouser (10) Patent No.: US 11,753,145 B2  
(45) Date of Patent: Sep. 12, 2023

(54) SPLIT CAM BRAKING SYSTEM

(71) Applicant: The Boeing Company, Chicago, IL (US)

(72) Inventor: Maria Nicole Clouser, Kenmore, WA (US)

(73) Assignee: The Boeing Company, Chicago, IL (US)

(*) Notice: Subject to any disclaimer, the term of this patent is extended or adjusted under 35 U.S.C. 154(b) by 14 days.

(21) Appl. No.: 17/452,485

(22) Filed: Oct. 27, 2021

(65) Prior Publication Data

US 2022/0212781 A1 Jul. 7, 2022

Related U.S. Application Data

(60) Provisional application No. 63/133,890, filed on Jan. 5, 2021.

(51) Int. Cl.
*B64C 13/32* (2006.01)
*F16H 35/00* (2006.01)
*F16D 41/00* (2006.01)

(52) U.S. Cl.
CPC ............. *B64C 13/32* (2013.01); *F16D 41/00* (2013.01); *F16H 2035/005* (2013.01)

(58) Field of Classification Search
CPC .... B64C 13/28; B64C 13/32; F16H 2035/005
See application file for complete search history.

(56) References Cited

U.S. PATENT DOCUMENTS

| 4,852,707 A * | 8/1989 | Ito ................... F16D 41/105 188/134 |
| 2013/0206530 A1* | 8/2013 | Adams ............. F16D 41/10 192/44 |
| 2017/0081017 A1* | 3/2017 | Barger .............. B64C 13/28 |

* cited by examiner

*Primary Examiner* — Philip J Bonzell
*Assistant Examiner* — Brendan Kroger Schneider
(74) *Attorney, Agent, or Firm* — Yee & Associates, P.C.

(57) ABSTRACT

A system and method for preventing back-drive in a braking system for a rotary actuator. The braking system comprises a housing and split cam design. A driving cam located within the housing is associated with an upstream side of the braking system. The driving cam is configured to rotate when a torque is applied to the upstream side. The braking system has a wedging cam and a plurality of cylindrical rollers. The wedging cam located within the housing and is associated with a downstream side of the braking system. The wedging cam is configured to react and prevent back-drive motion when torque is applied to the downstream side. The plurality of cylindrical rollers is positioned between the wedging cam and the housing. The plurality of cylindrical rollers is configured to wedge between a surface of the wedging cam and the housing when the torque is applied to the downstream side.

20 Claims, 9 Drawing Sheets

SPLIT CAM BRAKING SYSTEM

CROSS-REFERENCE TO RELATED APPLICATION

This application claims the benefit of U.S. Provisional Patent Application Ser. No. 63/133,890, filed Jan. 5, 2021, and entitled "Split Cam Braking System;" which is incorporated herein by reference in its entirety.

BACKGROUND INFORMATION

1. Field

The present disclosure relates generally to actuators. More specifically, the present disclosure relates to a split cam braking system used with rotary actuators assemblies for aircraft applications.

2. Background

Aircraft often employ rotary actuators to direct movement of mechanical parts throughout the aircraft. For example, without limitation, wing flap movement systems, slat movement systems, or some door applications have rotary actuators that work to drive the aircraft part into the appropriate position during takeoff, landing and during other points of operation of the aircraft.

Once movement of the part is complete, it is imperative to prevent back-drive of the actuator so that the part remains in the correct position. Undesired movement of aircraft parts could present efficiency or safety concerns.

Braking systems are integrated into rotary actuators to solve this problem. Such braking systems are designed to prevent back-drive. Commonly used braking systems include disc or skewed roller brakes, among others.

Both types of braking systems rely on friction plates to generate the holding force. Drag issues associated with friction plates may generate heat which can cause wear on the system. Moreover, the use of multiple friction plates in a disc type or skewed roller type braking system assembly may be larger than desired, thus limiting its use in constrained areas of the aircraft.

Therefore, it would be desirable to have a method and apparatus that takes into account at least some of the issues discussed above, as well as other possible issues.

SUMMARY

An illustrative embodiment of the present disclosure provides a braking system for a rotary actuator comprising a housing and split cam design. A driving cam is located within the housing and is associated with an upstream side of the braking system. The driving cam is configured to rotate and transmit torque when a load is applied to the upstream side. A wedging cam is also located within the housing and is associated with a downstream side of the braking system. The wedging cam is configured to prevent back-drive when torque is applied to the downstream side. A plurality of cylindrical rollers is positioned between the wedging cam and the housing of the braking system. The plurality of cylindrical rollers is configured to wedge between a surface of the wedging cam and the housing when the torque is applied to the downstream side, thus preventing back-drive. Several pairs of cylindrical rollers may be employed.

Another illustrative embodiment of the present disclosure provides a method for braking for a rotary actuator. A load is applied to an upstream side of a braking system via the rotary actuator. A driving cam within a housing in the upstream side of the braking system is rotated, and torque is transmitted to a wedging cam. The wedging cam within the housing rotates in conjunction with the driving cam. The load applied to the upstream side of the braking system then stops. Back-drive of the braking system is prevented using a plurality of cylindrical rollers oriented between the wedging cam and the housing and wedged between those two structures when torque is applied to the downstream side of the braking system.

A further illustrative embodiment of the present disclosure provides an aircraft having a geared rotary actuator and a braking system comprising a housing and a split cam design. The braking system has a driving cam, a wedging cam, and a plurality of cylindrical rollers. The driving cam is located within the housing and is associated with an upstream side of the braking system. The driving cam rotates and transmits torque when a load is applied to the upstream side. The wedging cam is also located within the housing and is associated with a downstream side of the braking system. The wedging cam prevents back-drive when torque is applied to the downstream side. The plurality of cylindrical rollers is positioned between the wedging cam and the housing of the braking system. The plurality of cylindrical rollers wedge between a surface of the wedging cam and the housing when the torque is applied to the downstream side, thus preventing back-drive. Several pairs of cylindrical rollers may be employed.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that aircraft manufacturers are designing aircraft parts, such as wing flaps, with smaller and smaller confined spaces to place associated mechanical components. As a result, some currently employed rotary actuator braking systems may be too big for those confined spaces, necessitating a redesign of the assembly.

The illustrative embodiments also recognize and take into account that braking systems that use friction plates may generate undesired levels of heat that result in inefficiencies in the system, chatter, and possibly damage to one or more components. The weight, size, and complexity of these systems that require friction plates may make assembly more laborious than intended.

Thus, the disclosed embodiments provide a braking system for a geared rotary actuator with a split cam design that does not utilize friction plates and is simple, compact, and easy to assemble. The braking system has a housing, a driving cam, a wedging cam, and a plurality of cylindrical rollers. The driving cam is located within the housing and is associated with an upstream side of the braking system. The driving cam is configured to allow rotation and transmit torque when a load is applied to the upstream side. The wedging cam is also located within the housing and is associated with a downstream side. The wedging cam is configured to prevent back-drive when torque is applied to the downstream side. The plurality of cylindrical rollers is positioned between the wedging cam and the housing of the braking system. The plurality of cylindrical rollers is configured to wedge between a surface of the wedging cam and the housing when the torque is applied to the downstream side. Several pairs of cylindrical rollers may be employed to prevent undesired back-drive. Simply, input into the upstream side of the braking system will allow bi-directional motion of both cams; however, the wedging cam will prevent any motion from input from the downstream side.

Figure 1:
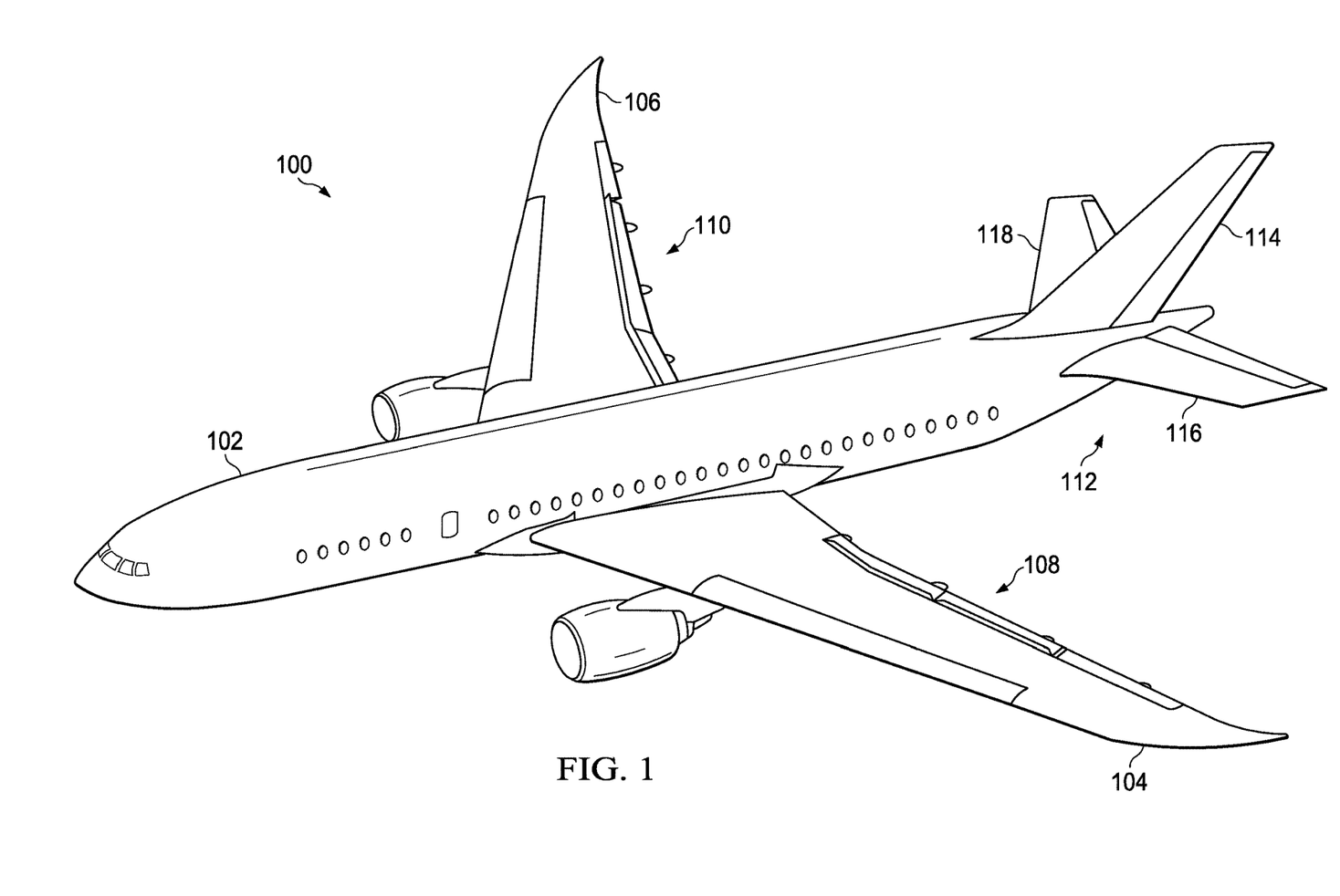
FIG. 1 is an illustration of an aircraft in accordance with an illustrative embodiment.

With reference now to the figures and, in particular, with reference to FIG. 1, an illustration of an aircraft is depicted in accordance with an illustrative embodiment. FIG. 1 depicts aircraft 100 with body 102 and wing 104 and wing 106. Body 102 is a fuselage in this illustrative example. Wing 104 has wing flaps 108 while wing 106 has wing flaps 110. Each of wing flaps 108 and wing flaps 110 may be controlled during operation of aircraft 100 using a rotary actuator and braking system.

Aircraft 100 also comprises tail section 112 with vertical stabilizer 114, horizontal stabilizer 116, and horizontal stabilizer 118. Movement of those components, if any, also may be controlled by a rotary actuator and braking system in accordance with an illustrative embodiment.

Figure 2:
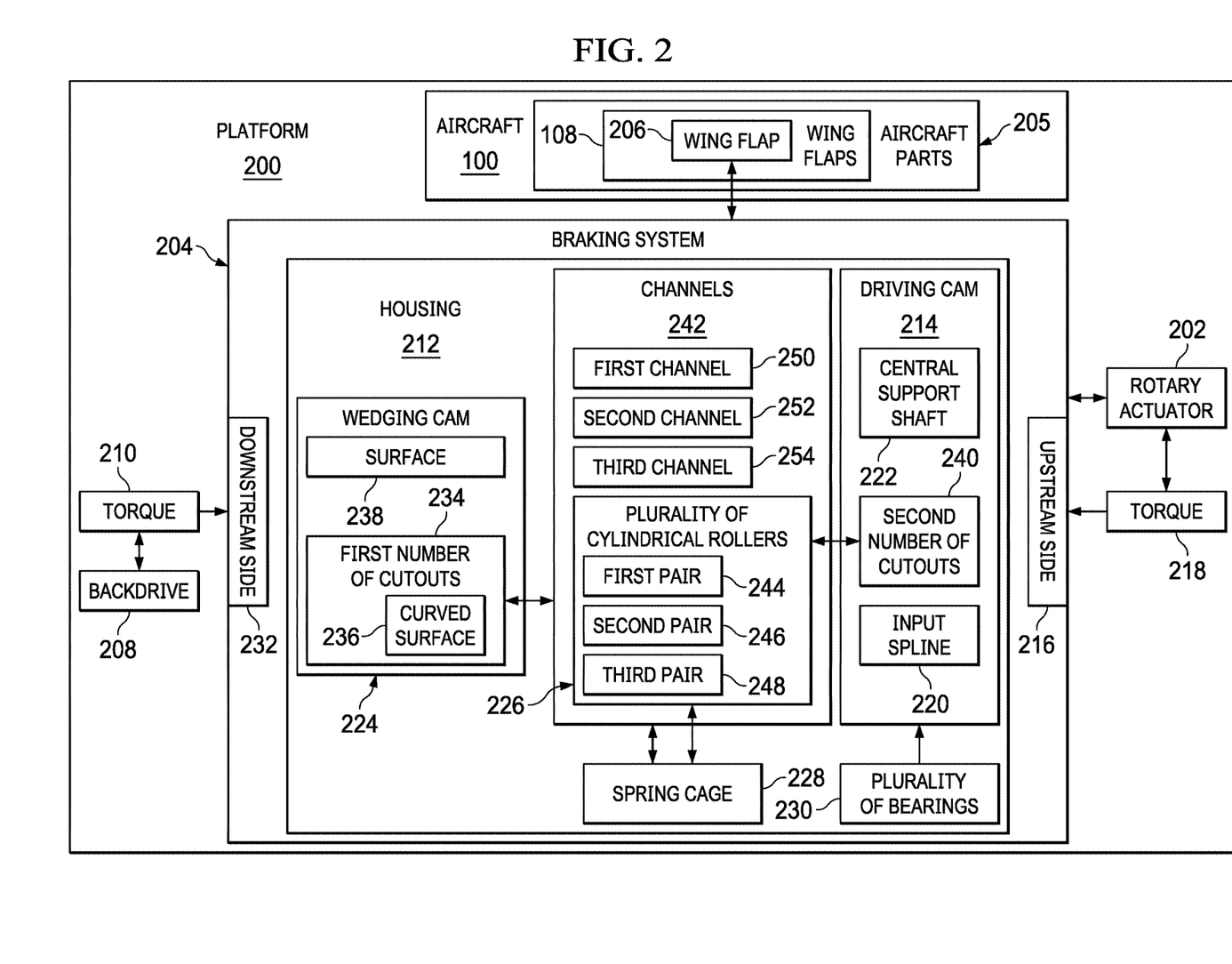
FIG. 2 is an illustration of a block diagram of a platform in accordance with an illustrative embodiment.

Turning now to FIG. 2, an illustration of a block diagram of a platform is depicted in accordance with an illustrative embodiment. Platform 200 has rotary actuator 202 and braking system 204 in this illustrative example.

Platform 200 may take a variety of different forms. For example, without limitation, rotary actuator 202 and braking system 204 may be implemented in a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where the prevention of back-drive is desirable.

In this illustrative example, platform 200 takes the form of aircraft 100. Aircraft 100 comprises a number of rotary actuators and associated braking systems implemented to control aircraft parts 205. As used herein, "a number of" when used with reference to items means one or more items. Thus, a number of rotary actuators is one or more rotary actuators.

Aircraft parts 205 may take a variety of different forms. For example, without limitation, one of aircraft parts 205 may take the form of a leading edge flap, a trailing edge flap, a leading edge slat, a trailing edge slat, a horizontal stabilizer, a folding wing tip, a door, or some other suitable part. In this illustrative example, aircraft parts 205 includes wing flaps 108 and wing flaps 110.

Wing flap 206 is one of wing flaps 108 in wing 104 of aircraft 100. Movement of wing flap 206 is controlled by rotary actuator 202 with braking system 204 in this illustrative example. Rotary actuator 202 comprises a combination of components configured to produce rotary motion used to move wing flap 206 in a desired fashion.

Braking system 204 comprises components configured to prevent or substantially prevent back-drive 208. The phrase "substantially prevent," as used herein, means to reduce, decrease, or eliminate back-drive completely, or within selected tolerances that are sufficient to certify the part for airworthiness or meet other standards for operation of braking system 204.

Back-drive 208 results in reversal of movement of rotary actuator 202 (and braking system 204) when movement driven by the input has been stopped. Specifically, torque 210 applied to the output side of braking system 204 causes back-drive 208. Back-drive 208 of braking system 204 is unwanted because back-drive 208 could dislodge wing flap 206 from its desired orientation while aircraft 100 is in operation. Back-drive 208 may cause safety or efficiency issues for wing flap 206, wing 104, or aircraft 100.

As depicted, braking system 204 comprises housing 212, driving cam 214, wedging cam 224, plurality of cylindrical rollers 226, spring cage 228, and plurality of bearings 230. Housing 212 is a structural component that encloses one or more parts in braking system 204. Housing 212 may be comprised of a metal, a metal alloy, steel, composite material, a combination thereof, or any other material or combination of material, depending on the particular implementation.

Driving cam 214 is a component located within housing 212. Driving cam 214 drives rotational movement within braking system 204. It receives input from rotary actuator 202. Driving cam 214 is associated with upstream side 216 of braking system 204 and is configured to rotate when torque 218 is applied to upstream side 216. Driving cam 214 allows bi-directional movement of braking system 204 when torque is applied to upstream side 216. Upstream side 216 may also be referred to as the "input side" of braking system 204.

In this illustrative example, driving cam 214 has input spline 220 and central support shaft 222. Central support shaft 222 is an axle that allows rotational movement of the cams. Both input spline 220 and central support shaft 222 may be fabricated as part of driving cam 214.

As illustrated, wedging cam 224 is a component located within housing 212 and is connected to driving cam 214. The two cams work in tandem in the system. Wedging cam 224 is associated with downstream side 232 of rotary actuator 202. Wedging cam 224 is configured to stop back-drive 208 when torque 210 is applied to downstream side 232. Wedging cam 224 may also be referred to as a "stopping cam" or "braking cam." Driving cam 214 and wedging cam 224 create the "split cam" design of braking system 204 in accordance with an illustrative embodiment.

Wedging cam 224 comprises a first number of cutouts 234 having curved surface 236. Instead of wedging cam 224 having a substantially circular cross section, first number of cutouts 234 are cut out in equal intervals around the circumference of the cross section of wedging cam 224. First number of cutouts 234 have curved surface 236 such that an engaging angle for plurality of cylindrical rollers 226 can be maintained.

In an illustrative embodiment, the engaging angle, also known as the "wedging angle" influences the efficiency of braking system 204. In an illustrative embodiment, the engaging angle may be, for example, without limitation, $q=3°$. In other illustrative embodiments, the engaging angle may be less than three degrees. In still other illustrative embodiments, the engaging angle may be more than three degrees.

In this illustrative example, plurality of cylindrical rollers 226 are roller bearings that employ long, thin cylindrical rollers. These rollers may resemble needles and may be referred to as "needle rollers" or "needle bearings." Plurality of cylindrical rollers 226 may be two times, three times, or four times longer than their diameter, or more.

Plurality of needle rollers 226 are positioned between wedging cam 224 and housing 212 and may be used to reduce friction between wedging cam 224 and housing 212 or between driving cam 214 and housing 212 when the system is moving (input torque is greater than output torque). However, the primary purpose of plurality of cylindrical rollers 226 is to prevent back-drive 208. To prevent back-drive 208, plurality of cylindrical rollers 226 are configured to wedge between surface 238 of wedging cam 224 and housing 212 when torque 210 is applied to downstream side 232 of rotary actuator 202. Specifically, plurality of cylindrical rollers 226 wedge between housing 212 and curved surface 236 of first number of cutouts 234 of wedging cam 224.

As depicted, driving cam 214 comprises second number of cutouts 240. Second number of cutouts 240 in driving cam 214 correspond to first number of cutouts 234 in wedging cam 224. Plurality of cylindrical rollers 226 is positioned within channels 242 through rotary actuator 202 created by first number of cutouts 234 and second number of cutouts 240. In other words, the split cam design of rotary actuator 202 comprises channels between the cams and the housing in which pairs of plurality of cylindrical rollers 226 reside.

In this illustrative example, plurality of cylindrical rollers 226 has first pair of cylindrical rollers 244, second pair of cylindrical rollers 246, and third pair of cylindrical rollers 248. First pair of cylindrical rollers 244 is positioned in first channel 250 between the cams and housing 212. Second pair of cylindrical rollers 246 is positioned in second channel 252 between the cams and housing 212. Third pair of cylindrical rollers 248 is positioned in third channel 254 between the cams and housing 212.

In some illustrative examples, more pairs or fewer pairs of cylindrical rollers may exist. Similarly, more or fewer than three channels 242 may cut through rotary actuator 202. In still other illustrative examples, more than two cylindrical rollers may be present in each channel, depending on the particular implementation.

Spring cage 228 is part of braking system 204. Spring cage 228 is a spring that holds a pair of cylindrical rollers together in its respective channel. Spring cage 228 prevents free play of the pair of cylindrical rollers. In other words, spring cage 228 stabilizes the cylindrical rollers and reduces backlash or lost motion. A separate spring cage 228 is used for each pair of plurality of cylindrical rollers 226.

In this illustrative example, plurality of bearings 230 are associated with at least one of driving cam 214 and wedging cam 224. Plurality of bearings 230 support the cams and promote smoother rotation of the cams within housing 212. Any readily available bearing may be selected for use with an illustrative embodiment.

In these illustrative examples, braking system 204 is devoid of friction plates. As a result, less heat is produced than with currently used systems and wear to components also may be reduced.

In operation of braking system 204, torque 218 comes in through upstream side 216 and causes rotation of driving cam 214. It then transfers through plurality of cylindrical rollers 226 and into wedging cam 224 and out downstream side 232 to move wing flap 206. Additional actuator may be present between braking system 204 and wing flap 206 to apply gear reduction as necessary. In this manner, both driving cam 214 and wedging cam 224 will rotate. However, if movement of driving cam 214 is stopped, and torque 210 tries to back-drive wedging cam 224, plurality of cylindrical rollers 226 will move along surface 238 of wedging cam 224 until they are wedged between it and housing 212, thus dumping the load into housing 212. As a result, back-drive 208 will be stopped.

With an illustrative embodiment, the split cam design allows drive from upstream side of 216 of rotary actuator 202 but not from downstream side 232. Rotary actuator 202 with braking system 204 could be more compact than currently used systems, thus able to fit into more confined spaces of the newly designed aircraft. The split cam design is simple with fewer components which promotes easier assembly, machining, and the like. An illustrative embodiment also reduces system chatter compared to more traditional no-back braking systems.

Although the illustrative embodiments in FIG. 2 have been described with reference to wing flap 206 in wing 104, rotary actuator 202 with braking system 204 may be configured for use with other systems in aircraft 100 or in other platforms. For example, without limitation, an illustrative embodiment may be configured for use with leading and/or trailing edge flaps and slats, horizontal stabilizer trip actuators, folding wing tips, doors or other suitable parts. The split cam design of an illustrative embodiment may be fitting for geared or even hydraulic rotary actuators.

Figure 3:
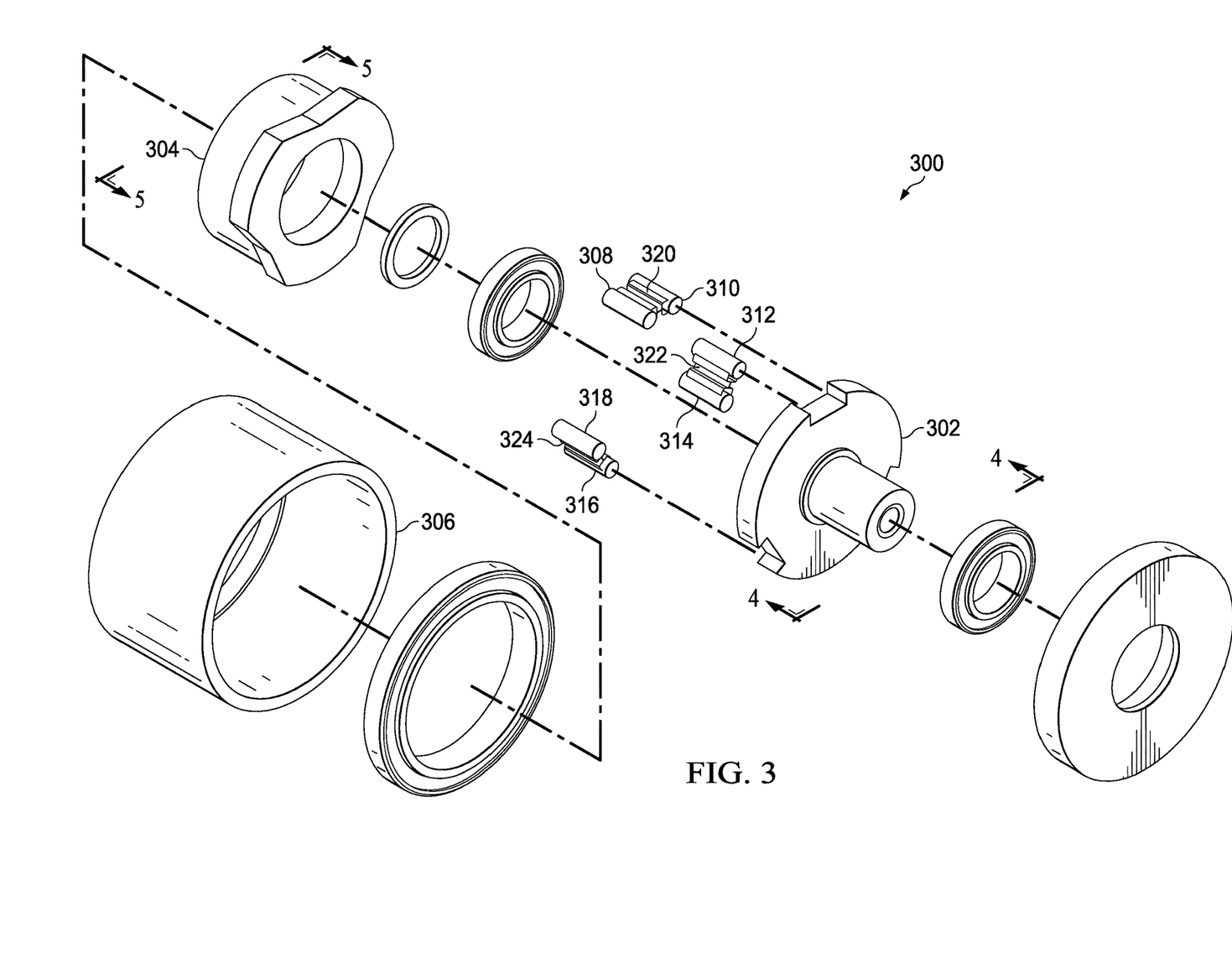
FIG. 3 is an illustration of an exploded view of rotary actuator and braking system in accordance with an illustrative embodiment.

With reference next to FIG. 3, an illustration of an exploded view of a rotary actuator and braking system is depicted in accordance with an illustrative embodiment. The components described herein are examples of physical implementations of rotary actuator 202 with braking system 204 shown in block form in FIG. 2.

In this view, split cam braking system 300 has driving cam 302, wedging cam 304, housing 306, cylindrical rollers (308, 310, 312, 314, 316, 318) and spring cages (320, 322, 324). These components represent examples of physical implementations for braking system 204, driving cam 214, wedging cam 224, housing 212, plurality of cylindrical rollers 226 and spring cage 228 from FIG. 2.

Figure 4:
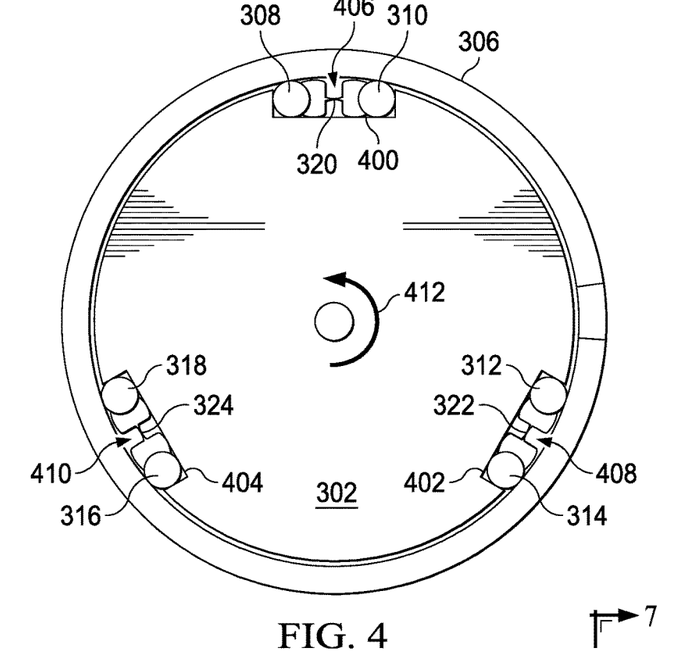
FIG. 4 is an illustration of a driving cam in accordance with an illustrative embodiment.

Turning now to FIG. 4, an illustration of a driving cam is depicted in accordance with an illustrative embodiment. This view of driving cam 302 is shown along lines 4-4 in FIG. 3 from the driving cam side of split cam braking system 300.

In this illustrative example, driving cam 302 has three cutouts spaced evenly around its circumference, cutout 400, cutout 402, and cutout 404. These cutouts (400, 402, 404) are examples of physical implementations for second number of cutouts 240 shown in block form in FIG. 2. These cutouts (400, 402, 404) may also be referred to as notches in these illustrative examples.

Cutout 400 creates channel 406 between driving cam 302 and housing 306, where cylindrical roller 308 and cylindrical roller 310 are located. Cutout 402 creates channel 408 between driving cam 302 and housing 306, where cylindrical roller 312 and cylindrical roller 314 are located. Cutout 404 creates channel 410 between driving cam 302 and housing 306, where cylindrical roller 316 and cylindrical roller 318 are located.

As depicted, cylindrical rollers (308, 310) are separated within channel 406 by spring cage 320 to help stabilize the pair of cylindrical rollers and prevent free play. In a similar fashion, cylindrical rollers (312, 314) are separated in channel 408 by spring cage 322 and cylindrical rollers (316, 318) are separated in channel 410 by spring cage 324.

Figure 5:
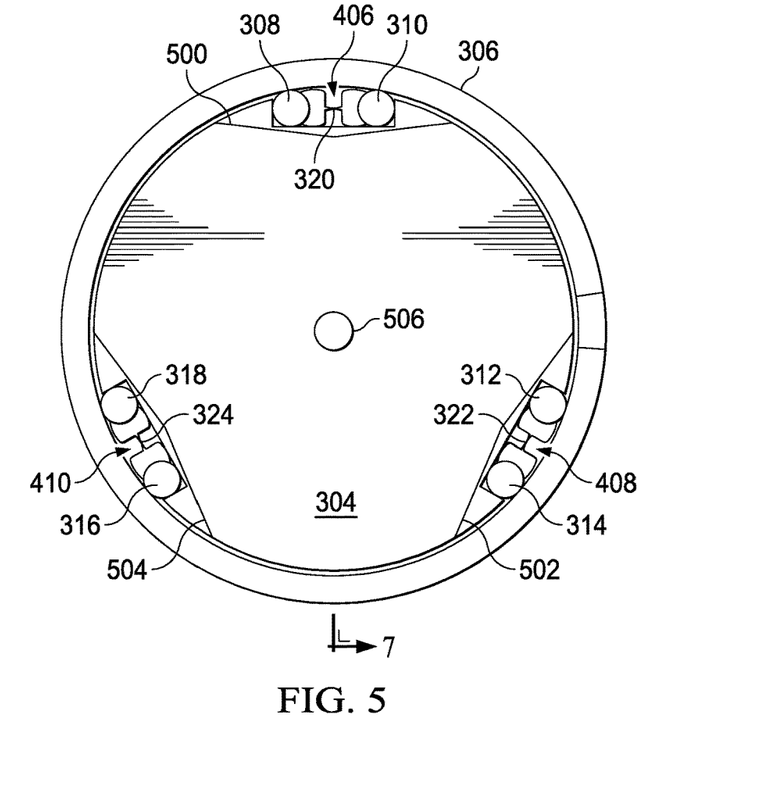
FIG. 5 is an illustration of a wedging cam in accordance with an illustrative embodiment.
Figure 7:
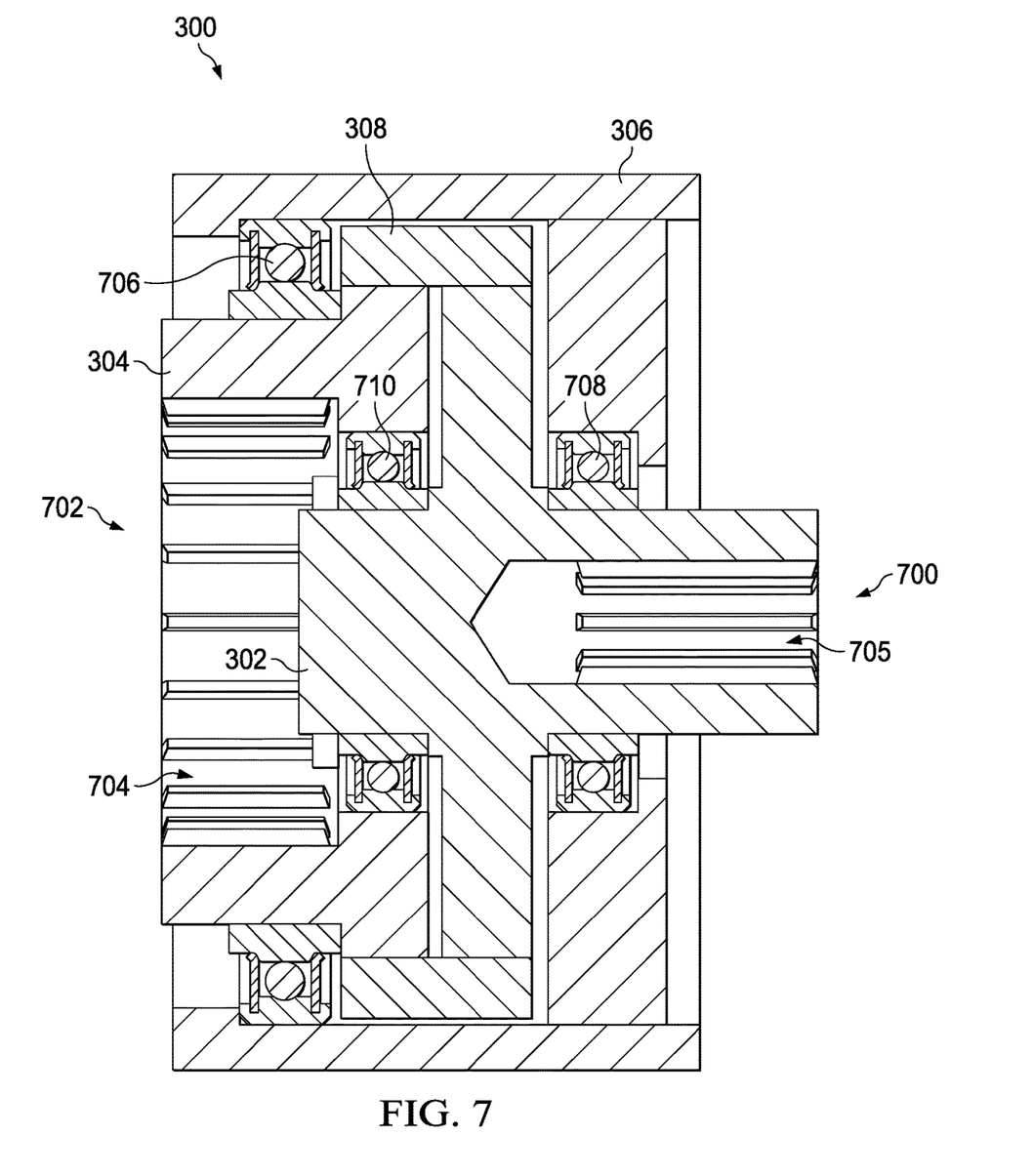
FIG. 7 is an illustration of a cross-sectional view of a split cam rotary actuator and braking system in accordance with an illustrative embodiment.

In this illustrative example, input torque in the direction of arrow 412 enters the system through driving cam 302 and transfers to wedging cam 304, shown in greater detail in FIG. 5 and FIG. 7. Only friction resists the motion such that driving cam 302 causes motion.

In FIG. 5, an illustration of a wedging cam is depicted in accordance with an illustrative embodiment. This view of wedging cam 304 is shown along lines 5-5 in FIG. 3 from the wedging cam side of split cam braking system 300.

As shown in this view, wedging cam 304 has cutouts (500, 502, 504) with a curved surface in each one. These cutouts (500, 502, 504) are examples of physical implementations of first number of cutouts 234 with curved surface 236 shown in block form in FIG. 2. As depicted, channel 406, channel 408, and channel 410 extend through wedging cam 304 due to the shape and orientation of cutouts (500, 502, 504). Central support shaft 506 runs through the center of split cam braking system 300 to support while allowing independent rotation of the two cams.

Figure 6A:
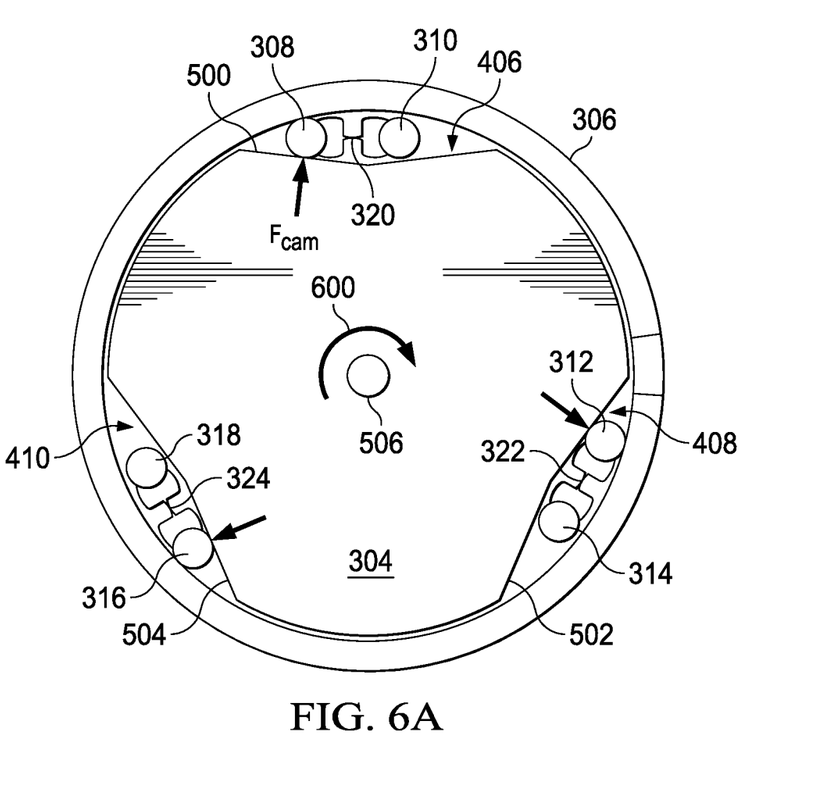
FIG. 6A is an illustration of a wedging cam in accordance with an illustrative embodiment.

With reference next to FIG. 6, another illustration of a wedging cam is depicted in accordance with an illustrative embodiment. FIG. 6 shows what happens when movement torque in the direction of arrow 412 in FIG. 4 stops.

In this illustrative example, back-driving torque in the direction of arrow 600 tries to move the system. Cylindrical roller 308 wedges between the surface of wedging cam 304 and housing 306. The back-driving torque creates a force ($F_{cam}$) normal to the surface of wedging cam 304, which is then reacted by housing 306 such that motion is stopped.

Figure 6B:
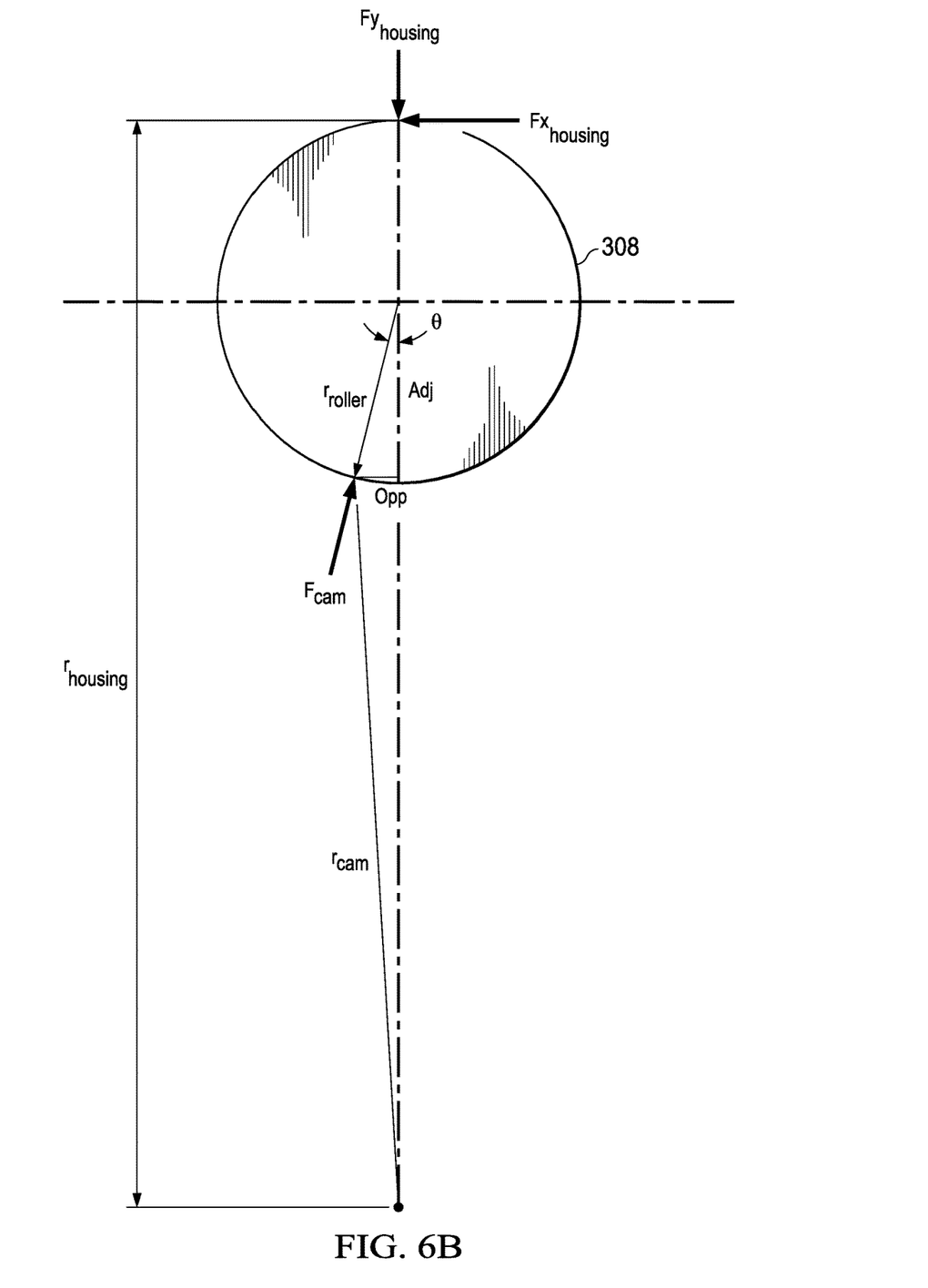
FIG. 6B is a free body diagram of a cylindrical roller in accordance with an illustrative embodiment.

FIG. 6B is a cylindrical roller free body diagram depicted in accordance with an illustrative embodiment. The free body diagram shown in this figure corresponds to cylindrical roller 308 in FIG. 6A when back-driving torque from output is being placed on the system.

Turning now to FIG. 7, an illustration of a cross-sectional view of a split cam rotary actuator and braking system is depicted in accordance with an illustrative embodiment. This cross-sectional view of rotary actuator 202 is taken along lines 7-7 in FIG. 5.

In this depicted example, torque is input from upstream side 700, moves through driving cam 302, through cylindrical roller 308 and into wedging cam 304 then output from downstream side 702. When back-drive torque comes from downstream side 702, the system reacts as described in FIG. 6.

As illustrated, wedging cam 304 is associated with output spline 704, which interfaces with a mating component to output force used to move the wing flap or other part. Input spline 705 mates with input components to drive driving cam 302. Bearings (706, 708, 710) can also be seen in this view. These bearings are examples of physical implementations for plurality of bearings 230 shown in block form in FIG. 2.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 may be implemented as physical structures.

Other configurations of split cam braking system 300 may be implemented other than those shown in FIGS. 3-7. The configurations described herein are not meant to be limiting as to the placement, orientation, type, or configuration of any component in split cam braking system 300. Split cam braking system 300 may be used with any platform, moveable or otherwise, that uses rotary actuators.

Figure 8:
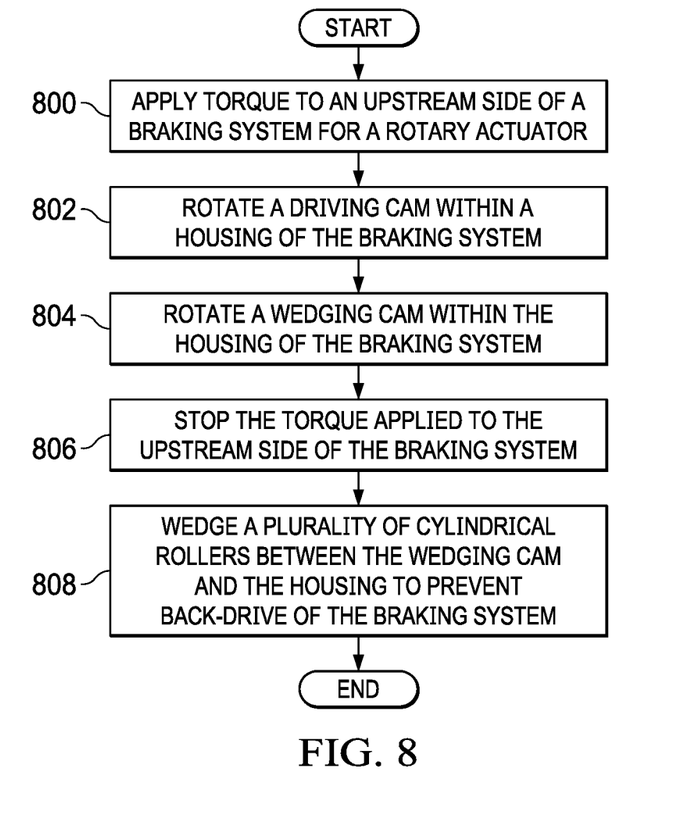
FIG. 8 is an illustration of a flowchart of a process for preventing back-drive in a rotary actuator in accordance with an illustrative embodiment.

With reference next to FIG. 8, an illustration of a flowchart of a process for reducing back-drive in a rotary actuator is depicted in accordance with an illustrative embodiment. The method depicted in FIG. 8 may be used to operate braking system 204 using braking system 204 in FIG. 2.

The process begins by applying torque to an upstream side of a braking system for a rotary actuator (operation 800). Next, a driving cam rotates within a housing in the upstream side of the braking system (operation 802). A wedging cam also rotates within the housing as the driving cam rotates (operation 804). The torque applied to the upstream side of the braking system stops (operation 806). When the driving cam stops rotating, back-driving torque is applied to the downstream side of the braking system. In response, a plurality of cylindrical rollers wedge between the wedging cam and the housing to prevent back-drive (operation 808), with the process terminating thereafter.

Figure 9:
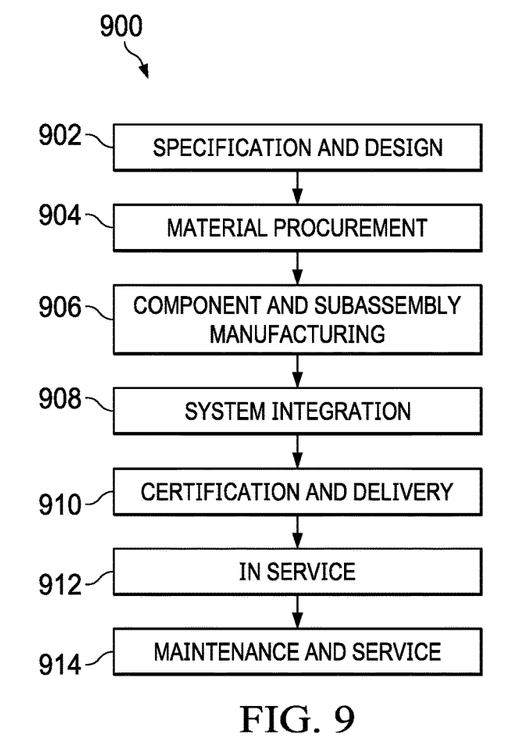
FIG. 9 is an illustration of a block diagram of an aircraft manufacturing and service method in accordance with an illustrative embodiment.
Figure 10:
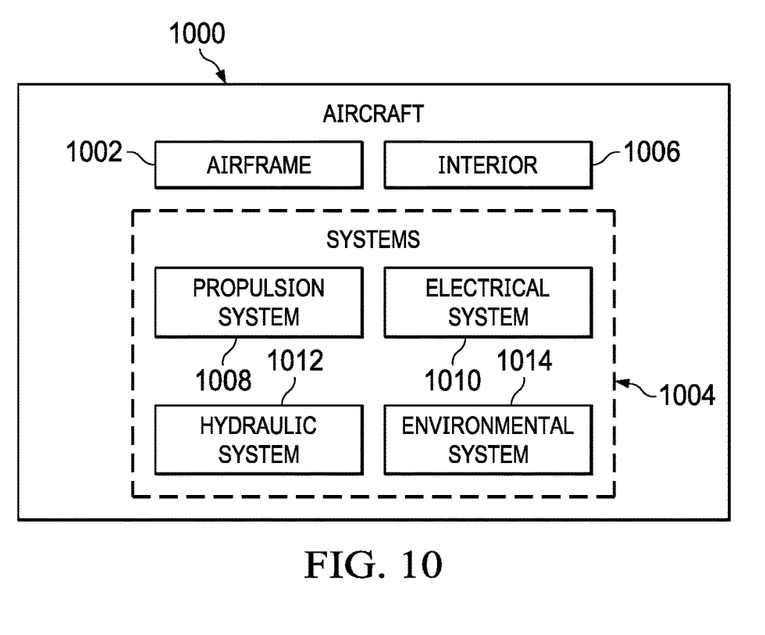
FIG. 10 is an illustration of a block diagram of an aircraft in which an illustrative embodiment may be implemented.

The illustrative embodiments of the disclosure may be further described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance, service, or inspection.

Split cam braking system 204 may be installed on an aircraft during component and subassembly manufacturing

906. In addition, split cam braking system 204 may be retrofitted onto aircraft 1000 during routine maintenance and service 914 as part of a modification, reconfiguration, or refurbishment of aircraft 1000 in FIG. 10.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914, inclusive of inspection, in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A braking system for a rotary actuator comprising:
   a housing;
   a driving cam within the housing and associated with an upstream side of the braking system, wherein the driving cam is configured to rotate when torque is applied to the upstream side;
   a wedging cam within the housing and associated with a downstream side of the braking system, wherein the wedging cam comprises a first number of cutouts, wherein each cutout has a curved surface, and wherein the wedging cam is configured to prevent back-drive when torque is applied to the downstream side; and
   a plurality of cylindrical rollers positioned in the first number of cutouts between the wedging cam and the housing, wherein each cylindrical roller is configured to wedge between a respective curved surface of each cutout of the wedging cam and the housing when the torque is applied to the downstream side.

2. The braking system of claim 1, wherein the first number of cutouts are cut out in equal intervals around a circumference of the wedging cam.

3. The braking system of claim 2, wherein the driving cam comprises:
   a second number of cutouts corresponding to the first number of cutouts in the wedging cam such that channels are formed between the driving cam and the wedging cam, wherein a pair of cylindrical rollers of the plurality of cylindrical rollers is positioned within each channel created by the first number of cutouts and the second number of cutouts.

4. The braking system of claim 1, wherein the plurality of cylindrical rollers comprises:
   a first pair of cylindrical rollers positioned in a first channel between the wedging cam and the housing;
   a second pair of cylindrical rollers positioned in a second channel between the wedging cam and the housing; and
   a third pair of cylindrical rollers positioned a third channel between the wedging cam and the housing.

5. The braking system of claim 4, wherein the braking system comprises:
   a spring cage associated with each pair of cylindrical rollers and positioned in each cutout of the first number of cutouts.

6. The braking system of claim 1 further comprising:
   a central support shaft associated with the driving cam.

7. The braking system of claim 6 further comprising:
   a plurality of bearings associated with at least one of the driving cam and the wedging cam.

8. The braking system of claim 1, wherein the braking system is devoid of friction plates.

9. A method for preventing back-drive of a rotary actuator, the method comprising:
   applying torque to an upstream side of a braking system in the rotary actuator;
   rotating a driving cam within a housing in the upstream side of the braking system;
   rotating a wedging cam within the housing as the driving cam rotates, wherein the wedging cam comprises a first number of cutouts, wherein each cutout has a curved surface;
   stopping the torque applied to the upstream side of the braking system; and
   wedging a plurality of cylindrical rollers positioned in the first number of cutouts between a respective curved surface of each cutout of the wedging cam and the housing to prevent back-drive when torque is applied to a downstream side of the braking system.

10. The method of claim 9, wherein the driving cam comprises:
a second number of cutouts corresponding to the first number of cutouts in the wedging cam such that channels are formed between the driving cam and the wedging cam, wherein a pair of cylindrical rollers of the plurality of cylindrical rollers is positioned within each channel created by the first number of cutouts and the second number of cutouts.

11. The method of claim 10 further comprising:
stabilizing the plurality of cylindrical rollers with a spring cage.

12. The method of claim 11, wherein the plurality of cylindrical rollers comprises a first pair, a second pair, and a third pair, and further comprising:
wedging at least one of each pair of cylindrical rollers between a respective curved surface of each cutout of the wedging cam and the housing.

13. The method of claim 9 further comprising:
rotating a central support shaft associated with the driving cam when the torque is applied to the upstream side of the braking system.

14. An aircraft comprising:
a geared rotary actuator; and
a braking system for the geared rotary actuator comprising:
a housing;
a driving cam within the housing and associated with an upstream side of the braking system, wherein the driving cam rotates when torque is applied to the upstream side;
a wedging cam within the housing and associated with a downstream side of the braking system, wherein the wedging cam comprises a first number of cutouts, wherein each cutout has a curved surface, and wherein the wedging cam prevents back-drive when torque is applied to the downstream side; and
a plurality of cylindrical rollers positioned in the first number of cutouts between the wedging cam and the housing, wherein each cylindrical roller wedges between a respective curved surface of each cutout of the wedging cam and the housing when the torque is applied to the downstream side.

15. The aircraft of claim 14, wherein the
first number of cutouts are cut out in equal intervals around a circumference of the wedging cam.

16. The aircraft of claim 15, wherein the driving cam comprises:
a second number of cutouts corresponding to the first number of cutouts of the wedging cam such that the plurality of cylindrical rollers is positioned within channels created by the first number of cutouts and the second number of cutouts.

17. The aircraft of claim 14, wherein the plurality of cylindrical rollers comprises:
a first pair of cylindrical rollers positioned in a first channel between the wedging cam and the housing;
a second pair of cylindrical rollers positioned in a second channel between the wedging cam and the housing;
a third pair of cylindrical rollers positioned in a third channel between the wedging cam and the housing; and
a spring cage associated with each pair of cylindrical rollers.

18. The aircraft of claim 17, wherein the geared rotary actuator is configured to move an aircraft part selected from one of a leading edge flap, a trailing edge flap, a leading edge slat, a trailing edge slat, a horizontal stabilizer, a folding wing tip, or a door.

19. The aircraft of claim 14, wherein the braking system further comprises:
a central support shaft associated with the driving cam.

20. The aircraft of claim 19, wherein the braking system further comprises:
a plurality of bearings associated with at least one of the driving cam and the wedging cam.

* * * * *